June 16, 1964 R. A. KLEIST 3,137,847
SIGNALLING SYSTEM
Filed Nov. 4, 1959 3 Sheets-Sheet 2

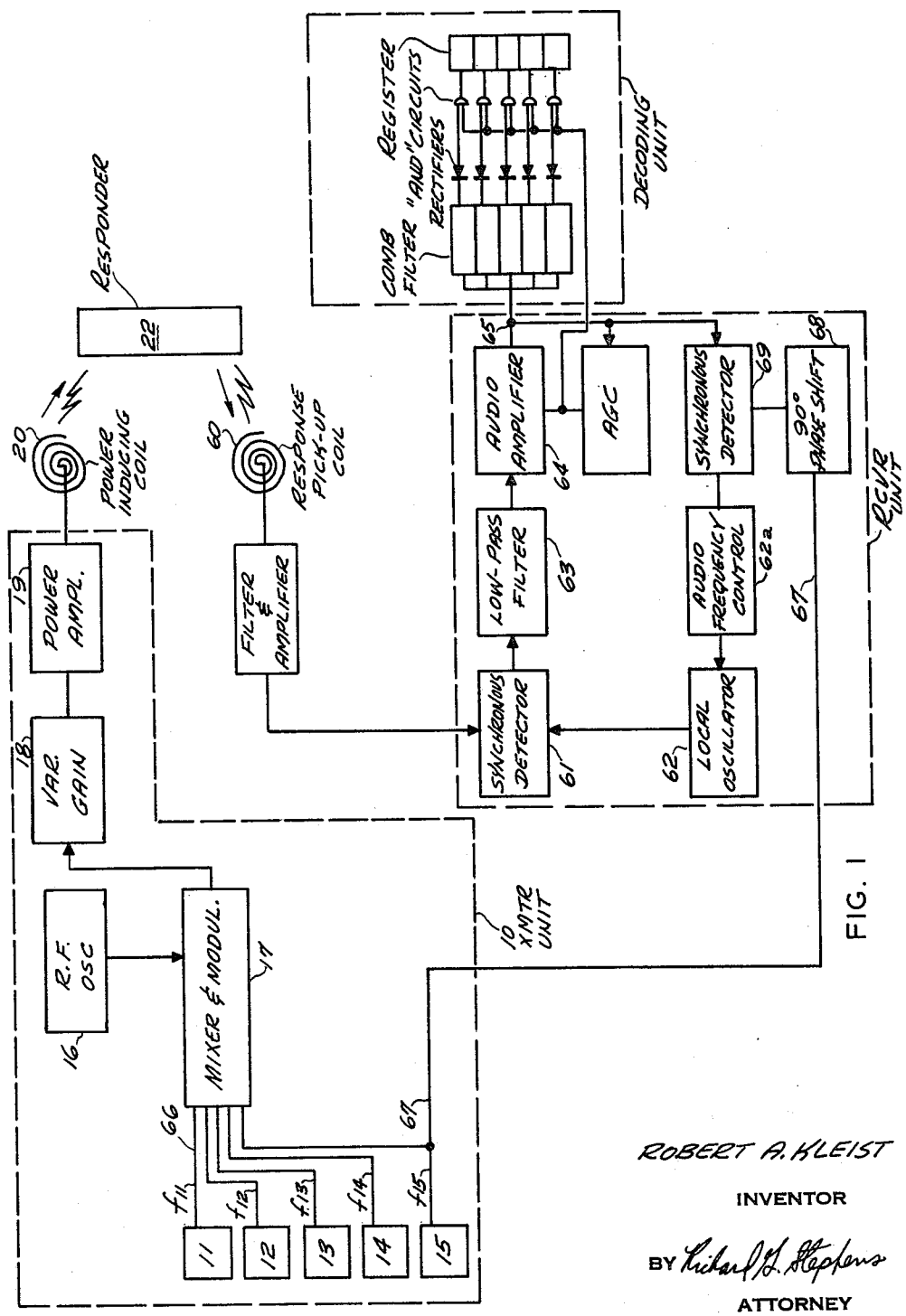

ROBERT A. KLEIST
INVENTOR

BY Richard B. Stephens
ATTORNEY

June 16, 1964

R. A. KLEIST 3,137,847

SIGNALLING SYSTEM

Filed Nov. 4, 1959

ROBERT A. KLEIST
INVENTOR

BY Richard G. Stephens
ATTORNEY

United States Patent Office 3,137,847
Patented June 16, 1964

3,137,847
SIGNALLING SYSTEM
Robert A. Kleist, Sunnyvale, Calif., assignor to Link Aviation, Inc., Binghamton, N.Y., a corporation of New York
Filed Nov. 4, 1959, Ser. No. 850,828
4 Claims. (Cl. 343—6.5)

This invention relates to signalling systems and is a continuation of and improvement to inventions shown in earlier copending applications of Clarence S. Jones, Serial No. 715,899, filed February 18, 1958, and Serial No. 739,909, filed June 4, 1958, now U.S. Patent No. 3,054,100, issued September 11, 1962, both of which are assigned to the same assignee as the present invention. These prior applications disclose signalling systems capable of electronically transmitting data between an interrogator device and one or more passive responder devices, where the two devices are capable of relative motion with respect to each other, so that signals may be provided from the responder which uniquely identify the responder, and, or instead, if desired, indicate one or more conditions associated with the responder. One exemplary disclosed application of the above-mentioned previous inventions is the use of responder devices on vehicles, such as railroad box cars, for the purpose of identifying each vehicle as it passes along a track beside which an interrogator unit is located. The responder devices shown in those previous systems are small and inexpensive, and being passive, no wired power sources or batteries are needed. Due to a number of reasons considered in detail in the previous applications, those systems are more accurate and reliable and less susceptible to noise than prior art systems. The present invention is an improvement over those prior inventions in that it provides systems of even greater accuracy and reliability which are even further less susceptible to noise. Any system which is more immune from noise than another system may be designed to use less power or bandwidth while still providing equal accuracy.

In my prior systems the interrogator units supply one or more electromagnetic signals having one or more frequencies to power-inducing coils, which may be mounted below or alongside the track, for example, in the case of a railroad identification application, so that power is induced into tuned circuits of various responder units as box cars carrying the responder units pass along the track. The power induced into the responders is used to develop and provide response signals, which may be received by a receiver and de-coded to provide data identifying the responder units. Each responder unit may be arranged to provide response signals of a different or unique nature.

In application Ser. No. 739,909, now Patent No. 3,054,100, there is shown a system of the above-described general type in which an interrogator unit supplies to its power-inducing coil apparatus, a high frequency carrier having a plurality of sub-carriers modulated on it. A responder, when it is located within the effective field of the carrier, such as when a boxcar carrying a responder passes near a stationary interrogator, operates to demodulate the high-frequency interrogator carrier to provide power to operate an oscillator in the responder, thereby to provide a response carrier. Each responder also operates upon the subcarriers received, and selectively filters out or selectively preserves certain of the subcarriers to provide a different group of sub-carriers, which are used to modulate the response carrier, thereby providing sub-carrier modulation on the response carrier from each responder which is unique to the particular responder. By demodulating the response carrier and determining which sub-carriers are present or which are absent, the identity of the responder may be determined.

The systems of each of the copending applications are extremely advantageous from standpoints of reliability and noise-rejection, partly because they utilize response carriers which differ in frequency from the interrogator carriers needed to produce them. It should be noted, however, that the sub-carriers in the system of application Ser. No. 739,909 are generated at the interrogator location. Although the transmission of the sub-carriers on the interrogator carrier (from the interrogator to a responder) and back on the response carrier (from the responder to the interrogator) may result in all of the subcarriers being changed in amplitude, and further result in one or more of the sub-carriers being completely eliminated from the response carrier, the phase of each of the sub-carriers is controlled at the interrogator, where each sub-carrier is generated. Since the phase of the sub-carriers on the response carrier is controlled at the interrogator, a phase comparison may be made between the phases of response sub-carriers and interrogator sub-carriers, and any response sub-carrier modulation determined not to have originated at the interrogator may be rejected as noise, thereby enhancing the sensitivity, accuracy and reliability of the system.

Thus it is a primary object of the present invention to provide an improved signalling system of the character described which is less susceptible to noise.

It is another object of the invention to provide an improved signalling system of the character described which may utilize an inexpensive and simple low-pass filter in lieu of band-pass filters heretofore used.

It is a further object of the invention to provide an improved low-noise signalling system of the character described wherein amplification may be effected principally at lower subcarrier frequencies, so that transistorization may be more readily effected.

It is yet another object of the invention to provide an improved responder device for use in signalling systems of the character described, in which clipping and cross-modulation of subcarrier modulation frequencies does not occur.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an electrical schematic block diagram of an exemplary embodiment of the invention, wherein a control sub-carrier received in the response signal is compared with a reference sub-carrier supplied from the transmitter unit to derive a control signal which phase-locks the receiver to the response carrier;

Figure 3:
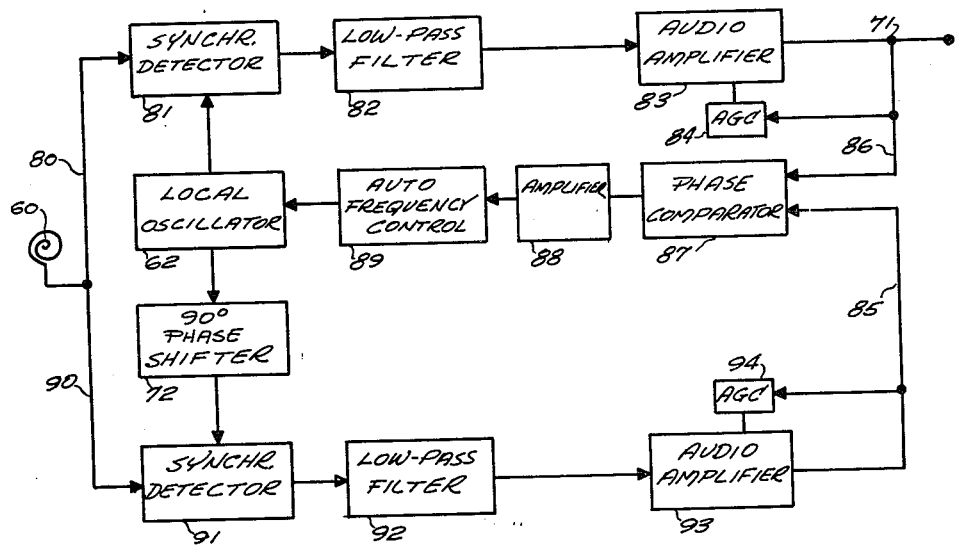
FIG. 3 is an electrical schematic block diagram of an alternative embodiment of the invention, wherein sub-carrier modulation in the side-bands of the response carrier signal provides a control signal which phase-locks the receiver to the response carrier.

In each of the figures certain well-known parts and assemblies are shown in block form for clarity, and suitable detailed circuits are readily available in the art.

In FIG. 1 an interrogator unit is shown generally in block form within dashed lines at 10. A plurality of sub-carrier oscillators 11–15 generate a plurality of sub-carrier signals having frequencies which may be identified for conveniences as $f_{11}$, $f_{12}$, $f_{13}$, $f_{14}$ and $f_{15}$, respectively. Although five frequencies are used for illustration, a greater or lesser number obviously may be employed. An interrogator carrier oscillator 16 generates an interrogator carrier signal having a frequency $f_{ic}$, and by means of conventional carrier modulation circuitry 17 associated with oscillator 16 the sub-carriers are impressed on the interrogator carrier. The modulated interrogator carrier is applied though a variable gain control device 18 and after suitable amplification at 19 to the interrogator power-inducing inductor 20, which in the example to be described, might be fixedly mounted below rail-top level between the rails of a railroad trackway, for example.

Railway cars carrying respective responder units periodically pass along tracks (not shown) and over power-inducing inductor 20. By means to be described below in greater detail, as each responder unit passes by the interrogator inductor, it receives the interrogator carrier with the five sub-carriers modulated thereon, and provides a response carrier having modulation uniquely-related to the particular responder. For example, a given responder 22 might provide a response carrier of frequency $f_{rc}$ with sub-carrier frequencies $f_{11}$, $f_{12}$, $f_{14}$ and $f_{15}$ modulated thereon, but with sub-carrier frequency $f_{13}$ omitted therefrom, while another responder may provide response carrier $f_{rc}$ with some other sub-carrier omitted. By sensing the presence of the other sub-carriers and the omission of the $f_{13}$ sub-carrier modulation from the response carrier, the interrogator is enabled to identify the response carrier as emanating from given responder 22. By providing different responders which pass and reject different sub-carriers according to an established code, it will be seen that a large plurality of passing objects may be identified.

In this application higher frequency signals upon which other signals may be modulated are referred to as carrier frequencies and RF or radio frequencies, while lower frequency signals modulated on the carrier frequencies are referred to as sub-carrier or audio frequencies. This language is adopted solely for convenience of illustration and is not intended to be restrictive. The sub-carriers well may utilize frequencies outside the aural range, and the carrier frequencies may lie in any part of the spectrum from above the sub-carriers to the microwave region. Using present techniques and components, a typical carrier frequency might be between 60–200 kilocycles, with sub-carriers spaced between 1 kc. and 10 kc.

In the embodiments of the invention described herein, each of the response carrier signals uses conventional double-sideband amplitude modulation, and the receiver circuits illustrated would ordinarily be designed for reception of such signals. It is within the scope of the invention, however, to utilize suppressed carrier AM modulation, or single-sideband reception (except for FIGURE 3, which doesn't operate with only SSB signal) and necessary modifications to do so will be apparent to those skilled in the art.

Figure 2:
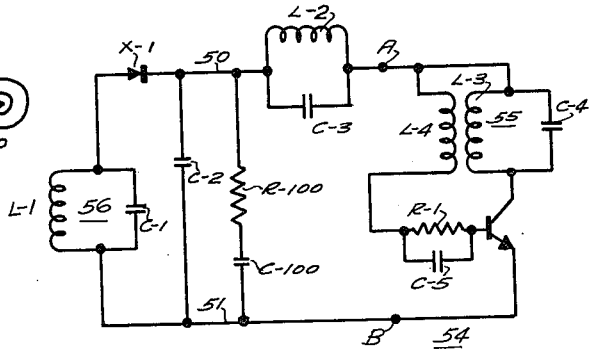
FIG. 2 is an electrical schematic diagram of an exemplary responder unit utilized in the prior art and also with some embodiments of the present invention.

The circuit of a typical responder unit is shown in FIG. 2. A tuned circuit 56 shown as comprising a parallel resonant tank having inductor L–1 and capacitance C–1 is tuned to the frequency $f_{ic}$ of the interrogator carrier, so that an alternating voltage builds up across the circuit whenever the responder approaches an interrogator power-inducing inductor such as 20. The alternating voltage, of course, consists of the interrogator carrier of frequency $f_{ic}$, with the five sub-carriers of frequencies $f_{11}$, $f_{12}$, $f_{13}$, $f_{14}$ and $f_{15}$ modulated thereon. Diode X–1 and RF filter capacitor C–2 serve to demodulate the carrier, and to provide a composite voltage between conductors 50, 51 consisting of a direct component modulated with the five sub-carriers. The voltage between conductors 50, 51 is then coded by eliminating one of the sub-carriers in FIG. 2, a parallel-tuned circuit 53 shown as comprising inductance L–2 and capacitance C–3 being shown connected in series with conductor 50. It may be assumed that filter 53 is tuned to the $f_{13}$ sub-carrier frequency, and hence the voltage existing between points A and B in FIG. 2 will have a direct component and sub-carrier components of four of the five sub-carriers, with the $f_{13}$ sub-carrier frequency omitted. The presence of series-connected resistor R–100 and capacitor C–100 may be neglected for the moment.

The coded composite voltage between points A and B is applied as shown to power and to modulate a response carrier generating means 54, which is shown in FIG. 2 as comprising a common type transistor oscillator. A direct voltage path will be seen to exist from point A through inductance L–3 of tank circuit 55 and the collector-emitter circuit of transistor T–1 to point B. Positive feedback to sustain oscillation is provided by inductively coupling the emitter current signal to the base of transistor T–1 by means of inductance L–4, which is inductively related to coil L–3 of tank circuit 55. Resistor R–1 serves to bias the transistor base, and capacitor C–5 serves as an RF by-pass around resistor R–1. Inasmuch as the voltage between points A and B is modulated by a certain four of the five sub-carriers, the response carrier $f_{rc}$ from the responder of FIG. 2 will be modulated with the same four sub-carriers. Other responder units may be provided with means to pass and return other sub-carriers while trapping out or rejecting other sub-carriers. Obviously more than one rejection filter may be used in a single responder, and if desired, pass filters may be used in lieu of rejection filters. A variety of coding techniques are available, and reference may be had to application Serial No. 739,909 for a more detailed treatment. The particular code selected for a given application of the invention will depend upon a number of factors, such as the number of different responders needed, the number of interrogators required, the allowable size and weight of the responders, and various other factors.

In application Serial No. 739,909 the response carrier signal received in the response pick-up coil 60 is carrier-demodulated and applied (through a gating circuit to insure that it exceeds a threshold level) to a plurality of sub-carrier filters which together comprise a comb filter, a filter section being provided for each sub-carrier frequency used, so that the presence or absence of an output signal from each filter indicates the corresponding presence or absence of a sub-carrier. The filter output signals are applied (via further gates) to set a register.

The series RC network comprising R–100 and C–100 may be provided to avoid clipping of the modulating frequencies, by providing a load impedance to modulating signals that will not exceed the D.C. load resistance of the detector portion of the responder, and preventing cross-modulation of the various audio subcarrier frequencies detected. While it is possible to reduce modulation percentage of the transmitted RF carrier to a level where clipping cannot occur, this provides a smaller net system modulation percentage than may be desirable, and than may be obtained in accordance with the arrangement now to be described.

The impedance of coupling capacitor C–100 is made to be much smaller than the resistance of R–100 at the lowest modulating frequency. The value of resistor R–100 is selected as the maximum or limit impedance value at which modulating frequencies are to be maintained without clipping. By making the resistance of R–100 equal the D.C. load resistance of the detector, clipping can be prevented, which may be better understood by consideration of the following expression:

$$m \approx \frac{|Z_m|}{R} m_t$$

wherein $m$ is modulation index of detected signal
$m_t$ is modulation index of transmitted signal
$Z_m$ is load impedance of diode X–1 at modulating frequency
R=D.C. load resistance of the detector.

The above expression assumes that neither detector efficiency nor tuned circuit impedance varies as between the carrier and the sidebands, and further assumes that tuned circuit impedance is very great compared to the D.C. load resistance. Clipping of the detected signal will occur only when $m$, the modulation index exceeds unity. Since the modulation percentage of the transmitted signal is necessarily equal to or less than unity, limiting the load impedance $Z_m$ to be equal to or less than the D.C. load resistance prevents clipping.

Returning to FIG. 1, it will be seen that in the present invention the response carrier signal induced in response pick-up coil 60 is applied (through filtering and amplifiers, not shown, if desired) to an RF synchronous detector 61, which demodulates the received response carrier and provides a signal comprising the group of sub-carrier code signals which were passed through the responder. Synchronous detector 61 is provided with an input signal from local oscillator 62, which, by means to be described, is caused to be phase-locked to the received response carrier. Since local oscillator 62 is phase-locked to the incoming response carrier, synchronous detector 61 is provided with a reference from local oscillator 62 against which incoming response signals may be compared, and disturbances reaching detector 61 which are not properly in-phase or on-frequency may be rejected as noise rather than signal. The demodulator 61 output is applied via a low-pass filter 63 to a sub-carrier amplifier 64. The selectivity of the system is governed by the pass characteristics of low-pass filter 63, and the gain of the system is determined by sub-carrier amplifier 64. The output signal of amplifier 64 will be seen to comprise the group of sub-carrier signals which were passed by the responder. Sub-carrier amplifier 64 is provided with automatic gain control, using well-known techniques, so that over the sensitivity range of the system the amplifier output signal will remain essentially constant in amplitude.

Figure 5:
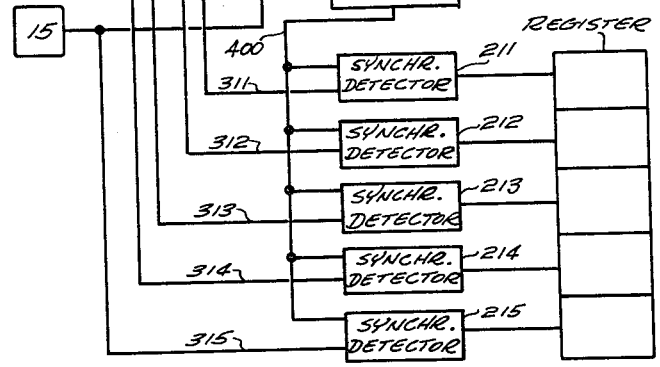
FIG. 5 is an electrical schematic block diagram illustrating an arrangement for accurately detecting and separating a composite sub-carrier signal into a plurality of individual signals to provide a digital quantity.

The sub-carrier signals on conductor 65 may be separated into separate sub-carrier signals by means of conventional audio filters, such as a comb filter, with the output signal from each comb filter section rectified to provide a direct voltage to operate a register or other output device. The AGC control voltage may be used, if desired, to control a plurality of gates, so that filter output signals below a desired threshold level are not allowed to set the register. An alternative but preferred arrangement for detection is shown in FIG. 5.

In FIG. 1 local oscillator 62 is phase-locked to the incoming response carrier by means of a control sub-carrier frequency that comes from one of the sub-carrier oscillators in interrogator transmitter unit 10, and which is modulated on the interrogator carrier in the same manner as the other sub-carriers. For explanation, assume that frequency $f_{15}$ from sub-carrier oscillator 15 is provided as the control sub-carrier. This control sub-carrier is required in addition to those employed for coding, and hence all of the responders constructed to be used with the system will be arranged to pass the control sub-carrier $f_{15}$. In addition to being applied (via conductor 66) to modulate the interrogator carrier, the $f_{15}$ control sub-carrier is routed (via conductor 67) to the receiver apparatus, where it is shifted in phase by 90 degrees, by conventional sub-carrier or audio phase-shift means shown in block form at 68, and applied as a phasing reference signal to a sub-carrier synchronous detector 69. The other input to detector 69 is the signal comprising those sub-carriers which were returned on the response carrier, and the signal will contain, of course, the control sub-carrier $f_{15}$.

If local oscillator 62 is exactly phase-locked with the incoming response carrier from pick-up coil 60, there will be a ninety-degrees phase difference between the $f_{15}$ signal on conductor 67 and the $f_{15}$ component of the signal on conductor 65, because phase shifter 68 serves to shift the reference $f_{15}$ sub-carrier by 90 degrees. Thus the output of synchronous detector 69 will be zero when local oscillator 62 is properly phase-locked onto the incoming response carrier. If the local oscillator frequency and incoming response carrier frequency differ, a change in phase will occur between the two input signals to detector 69, and the output of detector 69 will swing either positive or negative, depending upon the sense of frequency and phase difference, in an amount commensurate with frequency and phase difference. The detector output voltage from detector 69 is applied in a closed loop rebalancing arrangement to control an automatic frequency control circuit 62a associated with local oscillator 62, so that the local oscillator frequency is kept "slaved to" or locked in phase with the response carrier. The frequency "error" voltage output from detector 69 may be amplified to the extent desired, so that local oscillator frequency always closely tracks incoming response carrier frequency. While the quadrature relationship between the two input signals to detector 69 is illustrated as being established by a single phase-shifter 68, it will be recognized that in practice constant phase shifts will be introduced by conductor 67, filter 63, amplifier 64 and associated circuitry, and an adjustable phase shifter may be provided at 68 so as to adjust the total phase shift between the two inputs to ninety degrees when the local oscillator 62 is closely tracking the incoming response carrier frequency.

The system of FIG. 1 provides considerable advantage over tuned radio frequency (TRF) or heterodyne type systems in that no band-pass amplifier is required, as provision of a suitable band-pass filter is much more difficult than provision of a suitably sharp low-pass filter of the type needed at 63, and extreme selectivity may be easily provided with the arrangement of FIG. 1. Furthermore, amplification in the receiver system of FIG. 1 occurs at sub-carrier rather than carrier frequencies, and since use of contemporary transistors is more easily accomplished at the lower frequencies the invention allows the benefits of transistorization to be more readily obtained.

FIG. 3 illustrates an alternative embodiment of the invention wherein no sub-carrier frequency need always be passed and returned on the response carrier for phase-locking, and wherein all sub-carriers may be used for coding, so that system maximum possible capacity is doubled. Generally speaking, the principal differences from FIG. 1 are that in lieu of providing an additional sub-carrier modulated on the interrogator carrier, the local oscillator of the receiver portion of FIG. 3 is phase-locked by sub-carrier modulation present in the side bands of the response carrier; and since no sub-carrier reference is needed from phase-control interrogator transmitter sub-carrier, the connection shown as conductor 67 in FIG. 1 is not necessary, which is an important advantage where receiver and register location remote from interrogator location is considered desirable.

In the device of FIG. 3 the received response carrier is routed from response pick-up coil 60 via conductors 80 and 90 to synchronous detectors 81 and 91, each of which is supplied with an input signal from local oscillator 62, but with the signal supplied to detector 91 shifted in phase by 90 degrees with respect to the signal supplied to detector 81. Detector 81, low-pass filter 82 and sub-carrier amplifier 83, with its AGC circuit 84 together constitute a first signal detection channel, and detector 91, filter 92 and amplifier 93 with its AGC circuit 94 comprise a second signal detection channel.

If local oscillator 62 is locked in phase with the received response carrier, the output of synchronous detector 81 will be the modulation present as side band energy in the received response carrier. This output signal is passed through low-pass filter 82 to obtain desired selectivity and through amplifier 83 to obtain desired gain. The amplified output which appears on conductor 71 is held at substantially constant level by the AGC circuit 84 of the first channel. During these conditions the output of detector 91 will be zero, due to the 90 degrees phase shift provided in the system, since the reference input signal applied to detector 91 via response carrier frequency phase-shifter 72 will be 90 degrees out-of-phase with the incoming response carrier applied via conductor 90 as the other input signal to detector 91. Thus the input to phase comparator 87 from the second channel will be zero during these conditions, while the sub-carrier signals will be applied via conductors 71 and 86 to phase comparator 87. Having zero input on conductor 86, the output signal on conductor 88 from phase comparator 87 will be zero.

The output voltage from phase comparator 87 is applied, via amplifier 88, to control the automatic frequency control circuit 89 of local oscillator 62, keeping the local oscillator locked in phase with the received response carrier. Should the local oscillator begin to shift phase, i.e. attempt to change frequency, the input signals to detector 91 will no longer remain exactly in quadrature, and an output signal composed of the various coded sub-carrier components of the response signal will be provided, via filter 92 and amplifier 93, as an output on conductor 85 from the second channel. The phase of each of the sub-carrier components on conductor 85 with respect to its respective sub-carrier component of the signal will vary in an amount and direction depending upon the amount and direction of frequency shift of local oscillator 62 with respect to the received response carrier, and therefore, the appearance of an output signal from the second channel, at conductor 85, results in an output signal on conductor 88 from phase comparator 87. The polarity and magnitude of the phase comparator output signal on conductor 88 depends upon the sense and amount of frequency shift between the signals on conductors 85 and 86, and this phase error voltage on conductor 88 is applied, via suitable amplification, if desired, to control the local oscillator automatic frequency control circuit 89, thereby locking the local oscillator in phase with the response carrier.

The sub-carrier code signal on conductor 71 may be applied to a comb filter and thence a set of rectifiers to provide an output signal in the manner shown in FIG. 1, for example. Alternatively, the code signal may be applied to a set of synchronous detectors to recover separate sub-carrier components, providing further noise immunity, in a manner to be explained in connection with FIG. 5. The advantages of selectivity, noise immunity and simplicity of selectivity and amplification circuits of the FIG. 1 device also attend use of the FIG. 3 embodiment.

Figure 4:
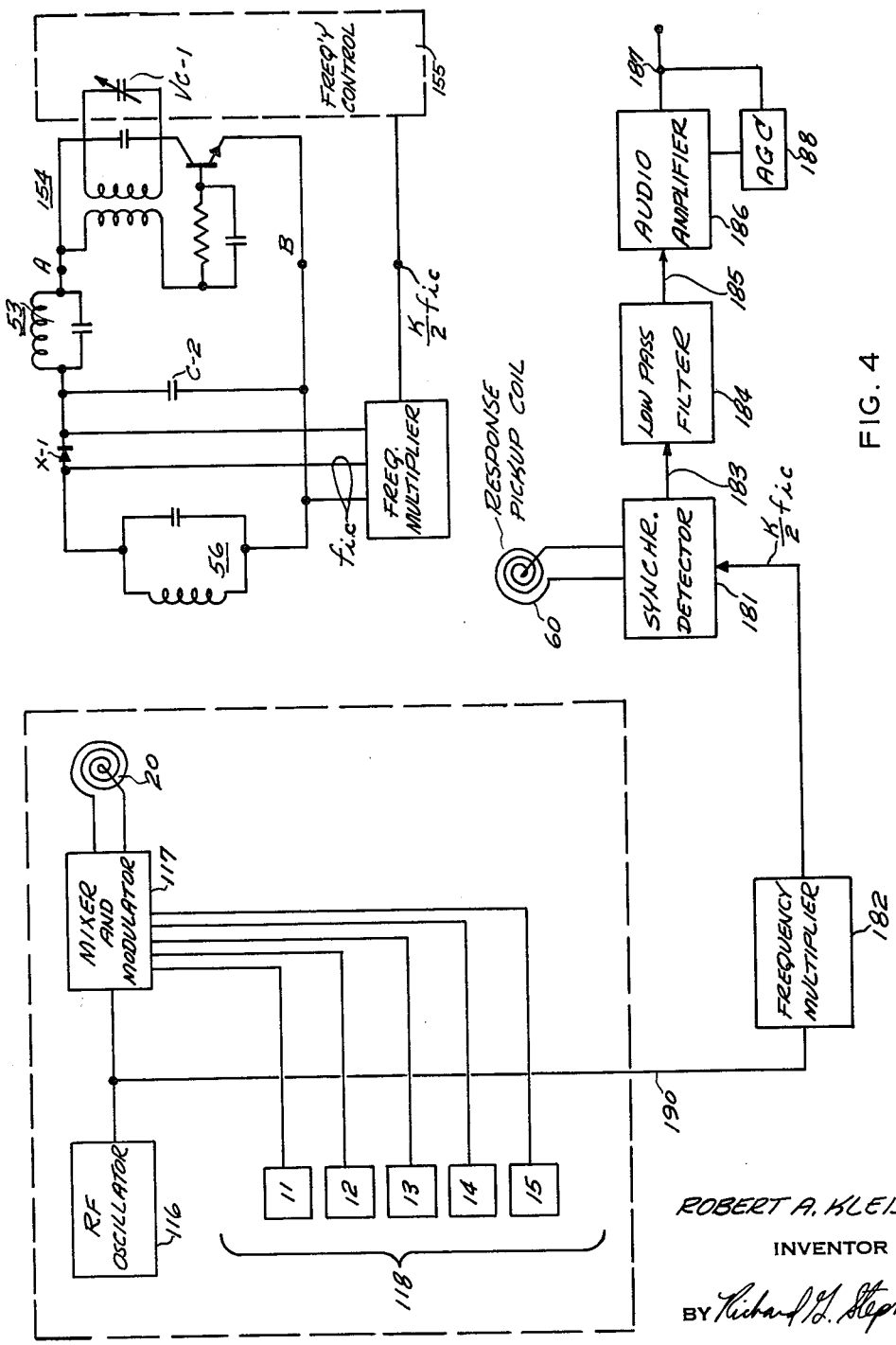
FIG. 4 is an electrical schematic block diagram of a further alternative embodiment of the invention wherein the response carrier oscillator in each responder is caused to lock in phase with a master carrier frequency from the transmitter, and the response carrier signal received at the receiver is phase-detected by a synchronous detector responsive as well to the master frequency.

The alternative embodiment shown in FIG. 4 differs considerably from the devices of FIGS. 1 and 3 in that in lieu of causing a receiver local oscillator to lock onto a response carrier, the device of FIG. 4 instead controls the response oscillator carrier to lock it in phase with a master frequency carrier signal from the interrogator transmitter. The master oscillator 116 in FIG. 4 provides a carrier signal which is modulated in modulator circuit 117 with a plurality of sub-carriers assumed to be generated in a plurality of sub-carrier oscillators 11–15. The modulated interrogator carrier is applied via further amplification assumed to be provided in block 117 to the interrogator power-inducing loop 20.

The responder units or "response blocks" intended for use with the system of FIG. 4 contain generally the same apparatus as the responder units used with prior systems, together with frequency multiplier and automatic frequency control circuits used to provide a coherent receiver system. A block diagram of the modified responder unit is shown in FIG. 4. The interrogator carrier signal induced in the responder pick-up circuit 56 is carrier-demodulated with rectifier X–1 and carrier frequency filter C–2 to provide the full group of code sub-carriers, some of which are trapped out and some of which are passed by filters (such as 53 of FIG. 2 or equivalent) to provide a resultant direct voltage having a coded group of sub-carriers superimposed thereon, and response oscillator 154 is powered and modulated by the resultant voltage to provide a response carrier modulated with those sub-carriers passed by the responder coding section. The response carrier frequency of the responder of FIG. 2 depends entirely upon the circuit parameters and constants associated with response oscillator 54, but in FIG. 4 the frequency of response oscillator 154 is shown being controlled by the output signal of frequency multiplier circuit 120. The master oscillator or interrogator carrier frequency is routed to frequency multiplier 120 as well as being demodulated in the manner described. Frequency multiplier 120 multiplies the interrogator carrier "master" frequency by an odd integer K, for example 3, 5 or 7, to provide a multiplied frequency signal, and an odd integer has been selected to minimize reception of interrogator transmitter harmonics by the sensitive receiver. As an example, the tank circuit of response oscillator 154 may be shunted with a "varicap" (voltage variable capacitor) VC–1, which is, in turn controlled by frequency multiplier 120, with a frequency discriminator (not shown) included within frequency control circuit 155, so as to control the frequency of response oscillator 154. Alternatively, response oscillator 154 may be connected to be pulsed by the output of frequency multiplier 120, and the frequency discriminator eliminated. A wide variety of techniques are known which are suitable for controlling response oscillator 154 from frequency multiplier 120.

The response carrier signal produced by response oscillator 154 of FIG. 4 is received by the response pick-up coil 60 and applied as one input signal to synchronous detector 181. The master frequency, or interrogator carrier frequency, is supplied to the receiver via means shown as comprising conductor 190. A further frequency multiplier 182, which may be identical to unit 120, multiplies the master frequency by the same odd integer K to provide a second or reference input signal to synchronous detector 181. It will be seen that the master oscillator signal, as multiplied by frequency multiplier 182, takes the place of a local oscillator generated signal in the FIG. 4 arrangement. Synchronous detector 181 passes only response pick-up signals which are properly phased with respect to the master oscillator carrier, thereby providing a low-noise output signal on conductor 183. The signal on conductor 183 will comprise those sub-carriers which were passed by the response block coding section. This signal is fed through low-pass filter 184 to obtain selectivity and through sub-carrier amplifier 186 to obtain sensitivity, and the output of amplifier 186 on conductor 187 is held at a substantially constant level by AGC network 188 associated with amplifier 186. The sub-carrier frequencies signal on conductor 187 may be applied to a comb filter or alternatively to synchronous detectors to separate the various sub-carriers and to provide a parallel digital signal. The advantages noted above regarding FIGS. 1 and 3 clearly apply as well to FIG. 4. One notable difference between the three systems lies in the nature of the required connection between transmitter and receiver units, and selection of which arrangement to use should depend in part on the contemplated physical separation between the two units. The FIG. 1 apparatus requires transmission of a sub-carrier frequency between the units, on conductor 67; the apparatus of FIG. 3 requires no physical connections between transmitter and receiver; and the apparatus of FIG. 4 requires transmission of a carrier frequency between transmitter and receiver.

While any one of the above described embodiments may use a comb filter to separate the coded sub-carrier signal into individual sub-carrier frequencies on different lines, coherent detection and separation of the different sub-carriers allows use of extremely narrow bandwidth for each sub-carrier, with attendant advantages of noise immunity and simplicity. In FIG. 5 each sub-carrier oscillator (11–15) is connected via an individual conductor 311–315 to supply its output signal to a respective synchronous detector in the receiver unit as well as being routed to the transmitter modulator circuit. The composite group of sub-carriers passed by a response block and carrier-demodulated, using any one of the abovedescribed systems, is present at conductor 400 in FIG. 5, which corresponds to conductors 65, 71 or 187 in FIGS. 1, 3 and 4, respectively. Separate synchronous detectors such as 211–215 are provided for respective sub-carriers $f_{11}$–$f_{15}$.

The output voltages from the synchronous detectors 211–215 will be a group of D.C. potentials having levels indicative of the amplitudes of the various sub-carrier components in the receiver output signals, and these D.C. potentials may be used to operate a register, an indicator or various other data-handling units. The detection systems shown in FIGS. 6 and 7 may be employed in the basic system shown in application Serial No. 739,909 as well as with the specific systems shown in FIGS. 1, 3 and 4.

In applications of the invention where it is necessary to mount synchronous detectors 211–215 in the decoder unit remote from the interrogator sub-carrier oscillator units, it may not be desirable to provide separate wire connections (such as 311–315) between the units for all of the sub-carrier frequencies, and in such cases it is possible to effect a savings by phase-locking all of the sub-carrier oscillators together at the transmitter by means of known frequency divider techniques, transmitting only a single one of the sub-carriers to the decoder unit, and then re-constructing the other sub-carriers from the single transmitted sub-carrier.

It will be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A signalling system, comprising in combination: transmitter means for providing a first carrier signal having a plurality of sub-carrier signals modulated thereon, said transmitter means having first means for generating said first carrier signal, a plurality of sub-carrier generating means for generating said plurality of sub-carrier signals, and modulation circuitry for modulating said sub-carrier signals on said first carrier signal; a passive responder device responsive to said first carrier and relatively movable with respect to said transmitter means, said passive responder device being operative to provide a coded second carrier having a selected group of said sub-carrier signals modulated thereon, the frequency of said second carrier being different from the frequency of said first carrier; receiver means for receiving and demodulating said second carrier to provide a composite sub-carrier signal containing the frequencies of said selected group of sub-carrier signals; detector means for receiving and phase-modulating said composite sub-carrier signal to provide a digital signal coded in accordance with the selection of sub-carrier signals provided in said responder, said detector means including a synchronous detector responsive to at least one component of said composite sub-carrier signal received from said responder and to a further signal received directly from said transmitter, said synchronous detector being operable to compare the phase of said component of said composite sub-carrier signal and said further signal, and operative to reject as noise components of said at least one component of said composite sub-carrier signal which do not occur in proper phase relationship with said further signal.

2. Apparatus according to claim 1 in which said detector means comprises a plurality of synchronous detectors for respective of said sub-carrier signals, each of said synchronous detectors having a signal input circuit, a reference input circuit and an output circuit; transmission means connected between said transmitter means and said detector means for providing said plurality of sub-carrier signals at said detector means, each of said sub-carrier signals being connected to the reference input circuit of a respective synchronous detector; and means for applying said composite sub-carrier signal to the signal input circuit of each of said synchronous detectors, thereby to provide outputs from said output circuits of said detectors which comprise said digital signal.

3. Apparatus according to claim 2 in which said transmission means comprises a plurality of conductors individual to respective sub-carrier signals connected between said transmitter means and said detector means.

4. A signalling system, comprising in combination: transmitter means for providing a first carrier signals having a plurality of sub-carrier signals modulated thereon, said transmitter means having first means for generating said first carrier signal, a plurality of sub-carrier generating means for generating said plurality of sub-carrier signals, and modulation circuitry for modulating said sub-carrier signals on said first carrier signal; a passive responder device responsive to said first carrier and operative to provide a coded second carrier having a selected group of said sub-carrier signals modulated thereon; said responder including first frequency multiplying means responsive to said first carrier and operative to multiply the frequency of said first carrier by an odd integer to provide said coded second carrier; receiver means for receiving and demodulating said second carrier to provide a composite sub-carrier signal containing the frequencies of said selected group of sub-carrier signals; said receiver means comprising a synchronous detector responsive to said coded second carrier and a reference frequency signal for providing a carrier-demodulated signal, low-pass filter and amplifier means for filtering and amplifying said carrier-demodulated signal to provide said composite sub-carrier signal, and transmission means connected to apply said first carrier signal from said transmitter means to second frequency multiplying means associated with said receiver means, said second frequency multiplying means being operable to multiply said first carrier signal by said odd integer to provide said reference frequency signal; and detector means for receiving and demodulating said composite sub-carrier signal to provide a digital signal coded in accordance with the selection of sub-carrier signals provided in said responder.

References Cited in the file of this patent

UNITED STATES PATENTS

| | | |
|---|---|---|
| 2,369,662 | Deloraine et al. | Feb. 20, 1945 |
| 2,581,056 | Walmsley et al. | Jan. 1, 1952 |
| 2,753,550 | Treharne | July 3, 1956 |
| 2,901,634 | Lubin | Aug. 25, 1959 |
| 2,910,579 | Jones et al. | Oct. 27, 1959 |
| 2,927,321 | Harris | Mar. 1, 1960 |
| 3,018,475 | Kleist et al. | Jan. 23, 1962 |